April 28, 1970 N. L. FIELD III, ET AL 3,509,287

CODE TRANSMITTER UTILIZING A PRINTED CIRCUIT DISC

Filed April 1, 1966 5 Sheets-Sheet 1

INVENTORS N. L. FIELD, III
R. E. WADDELL

BY Harry C. Newman

ATTORNEY

CODE TRANSMITTER UTILIZING A PRINTED CIRCUIT DISC

Filed April 1, 1966 5 Sheets-Sheet 2

United States Patent Office 3,509,287

Patented Apr. 28, 1970

3,509,287

CODE TRANSMITTER UTILIZING A PRINTED CIRCUIT DISC

Nathaniel L. Field III, Ann Arbor, Mich., and Richard E. Waddell, Indianapolis, Ind., assignors to Bell Telephone Laboratories, Incorporated, New York, N.Y., a corporation of New York Filed Apr. 1, 1966, Ser. No. 539,469
Int. Cl. H04m 3/42
U.S. Cl. 179—90 10 Claims

ABSTRACT OF THE DISCLOSURE

The apparatus includes groups of slide selected switches, a like number of groups of slow sequentially actuated switches, and a group of fast sequentially actuated switches provided by the interaction of contacts with conductive areas on a printed circuit board. The slide switches, slow switches, and fast switches are interconnected by conductive paths extending through the printed circuit board to form a switching matrix having a unique configuration, and the matrix is connected in series with a relay across a power source. Pulses are transmitted concurrent with each actuation of a fast switch until a path is provided through the switching matrix whereupon the relay is energized to eliminate the transmission of pulses until the next sequential actuation of the fast switches.

This invention relates to code transmitters and particularly to automatic call transmitters.

The typical automatic call transmitter is a fairly complex device in that it usually includes one or more mechanical linkages, clutches, ratchet wheels and pawls, cams, and spring members, in addition to a plurality of relays and switches. While assemblages of this nature can be constructed that are reliable, it is almost axiomatic that the fewer the components in a device the greater its reliability.

An object of this invention is to provide an automatic call transmitter that has relatively few components and through this simplicity achieves a high degree of reliability.

This and other objects of this invention are achieved in an illustrative embodiment thereof wherein the call transmitter comprises a printed circuit board having three groups of conductive patterns thereon. Three sets of contacts, one of which is manually positioned prior to the operation of the call transmitter, and two of which rotate during the operation of the call transmitter, respectively interact with the three groups of conductive patterns to provide first, second, and third pluralities of switches.

The first plurality of switches is actuated selectively by the manually positioned contacts, while the second and third pluralities of switches are actuated sequentially by the associated rotating contacts. There is a like number of first and second switches and each first switch is connected in series with an individual second switch. In addition, the pairs of series connected first and second switches are arranged in groups with the pairs of series connected first and second switches in each group connected in parallel with one another. Finally, each group of first and second switches is connected in series with an individual third switch, each third switch and the group of first and second switches in series therewith being connected in parallel with each other third switch and the group of first and second switches in series therewith.

The interconnection between the first, second, and third switches provides a switching matrix, and it is connected in series with a relay across a power source. One second switch in each group is actuated for each complete sequential actuation of the third switches, and when a path is provided through the switching matrix by the simultaneous actuation of a first, second, and third switch that are connected in series with one another, the relay is energized. The relay includes a normally open switch that is connected in parallel with a pulsing switch, and both switches are connected across a telephone line. The pulsing switch acts to interrupt the telephone line and transmit pulses thereover, but when the relay is energized, an alternative path is provided for the line current and no pulses are transmitted.

In the operation of the call transmitter, a pulse is transmitted concurrent with each actuation of a third switch until a path is provided through the switching matrix. Thereafter no further pulses are transmitted until a subsequent sequential actuation of the third switches commences.

A complete understanding of the invention and of these and other features and advantages thereof may be gained from consideration of the following detailed description which in conjunction with the accompanying drawing discloses two embodiments of the invention. It is to be expressly understood, however, that the drawing and description are not to be construed as defining the limits of the invention.

Figure 1:
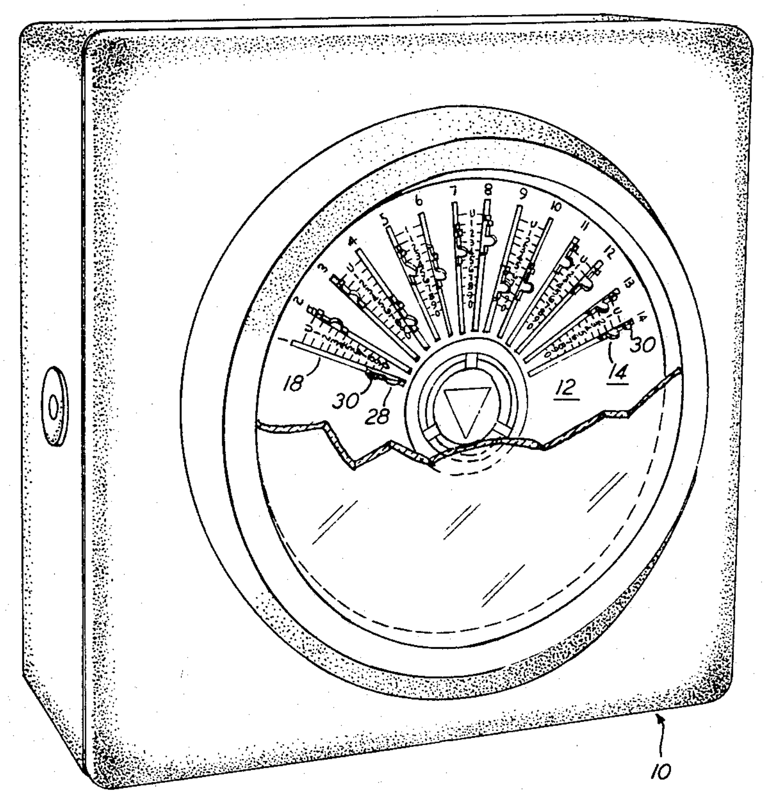
FIG. 1 is a perspective view of a telephone embodying the automatic call transmitter of this invention.

Referring to the drawings and FIG. 1 in particular, in the embodiment of the call transmitter herein disclosed, the call transmitter is employed as a preset dial in an automatic reporting telephone 10. Such a telephone is advantageously utilized in conjunction with unattended equipment at a remote location to report any occurrence with regard to the equipment that requires the attention of a person supervising the equipment. When an occurrence of this nature takes place, the automatic reporting telephone seizes the telephone line with which it is associated, dials the telephone number of the supervisor, and transmits a recorded message apprising the supervisor of the location of the telephone and the occurrence of the condition.

The call transmitter is programmed to dial a particular number by means of a slide selector switch 12, a detailed description of which is found in U.S. Patent 3,308,250 to N. L. Field III and J. F. Ritchey, issued Mar. 7, 1967. For purposes of the present application, a brief description of the slide selector switch 12 suffices.

Figure 2:
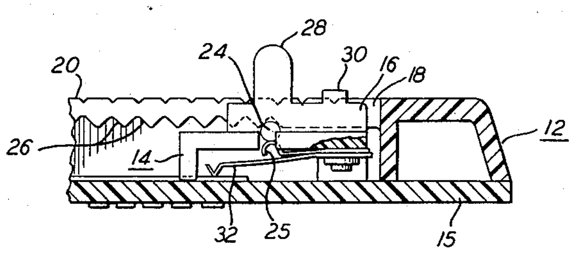
FIG. 2 is a sectional view showing one of the digit selectors and a portion of the face plate and printed circuit board with which it interacts, these being the elements involved in selecting a particular number to be called by the call transmitter.

As shown in FIGS. 1 and 2, the slide selector switch 12 includes a plurality of digit selectors 14, there advantageously being fourteen selectors to permit the selection of a telephone number up to fourteen digits in length. Each selector 14 rides on a printed circuit board 15 and has an upstanding ridge 16 that extends into a slot 18 in a face plate 20 fastened to the printed circuit board, each selector being thereby restrained to move along the length of its associated slot.

In addition, each selector 14 includes a cylindrical detent 24 that is biased by a spring member 25 into engagement with eleven abutting V-shaped notches 26 on the underside of the face plate 20, and the interaction therebetween limits the location of each selector along the length of its associated slot 18 to eleven discrete positions.

Each selector 14 further includes a tab 28 and a boss 30 that extend from the ridge 16 above the upper surface of the face plate 20. The tab 28 of each selector 14 is used to displace the selector from one of its discrete positions to another, while the boss 30 serves as a marker for indicating the particular position that the selector is in according to indicia adjacent to each slot 18. The indicia comprise the letter U, which stands for unused, and the digits 1 through 0, and in each discrete position of a selector 14, the boss 30 thereof is aligned with one of the indicia.

Figure 3:
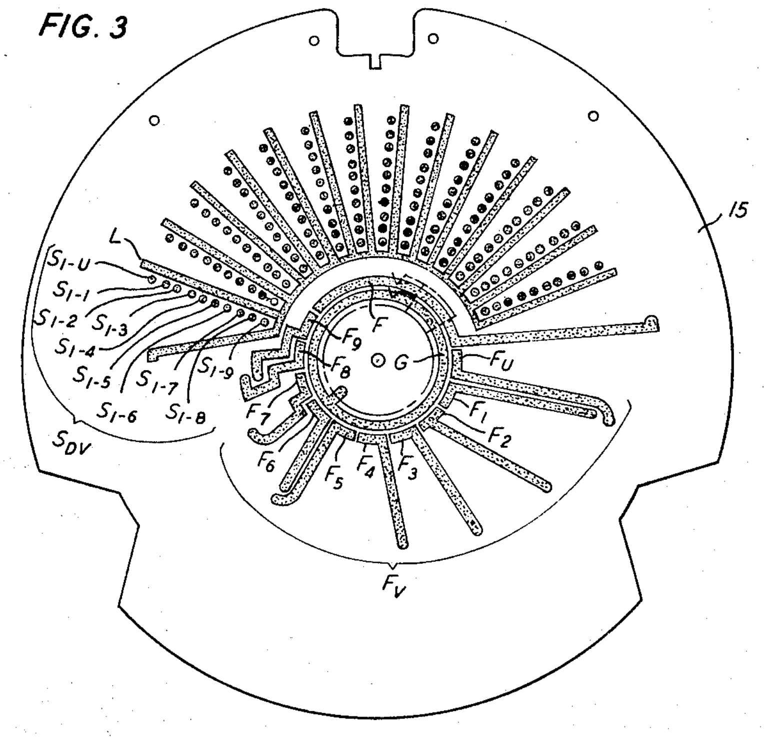
FIG. 3 is a top view of the printed circuit board.

Referring now to FIGS. 2 and 3, each selector 14 includes a pair of contacts 32, only one of which is shown. The contacts 32 are electrically connected together and are biased toward the printed circuit board 15. One contact 32 of each selector 14 engages an elongated conductor L, the conductors L extending radially from a common arcuate conductor and being connected to one another thereby.

The other contact 32 of each selector 14 engages one of ten abbreviated conductors spaced parallel to an adjacent conductor L. Each abbreviated conductor is designated according to the digit and the value that it represents. Thus the abbreviated conductors associated with the selector 14 for the first digit are respectively designated $S_{1-U}$, $S_{1-1}$, $S_{1-2}$, $S_{1-3}$, $S_{1-4}$, $S_{1-5}$, $S_{1-6}$, $S_{1-7}$, $S_{1-8}$, and $S_{1-9}$. Likewise, the abbreviated conductors associated with the selector 14 for the sixth digit are designated $S_{6-U}$, $S_{6-1}$, $S_{6-2}$, and so on. The abbreviated conductors as a group may therefore be designated $S_{DV}$, the subscript D standing for digit and varying from 1 to 14, and the subscript V standing for value and varying from U to 9.

It is seen that the contacts 32 of each selector 14 serve to electrically connect the associated conductor L to one of the conductors $S_{DV}$ adjacent thereto, and the particular conductor $S_{DV}$ to which the conductor L is connected corresponds to the position of the selector. Thus when the selector 14 for the first digit is positioned with the boss 30 thereof in alignment with the indicium 9, the contacts 32 of the selector connect the conductor L to the conductor $S_{1-9}$. Similarly, when the selector 14 for the second digit is positioned with the boss 30 thereof in alignment with the indicium U, the contacts 32 of the selector connect the conductor L to the conductor $S_{2-U}$. However, when the selector 14 for a digit is positioned with the boss 30 thereof in alignment with the indicium 0, the contacts 32 of the selector only engage the conductor L and therefore do not connect the conductor L to any of the conductors $S_{DV}$.

The interaction of the contacts 32 of the selectors 14 with the conductors $S_{DV}$ and L associated therewith provides the equivalent of ten groups of normally open switches with fourteen switches in each group. For purposes of schematic representation this plurality of normally open selectively actuated switches is designated $S_{DV}L$, the switch designation corresponding to the conductors interconnected by the contacts.

Figure 4:
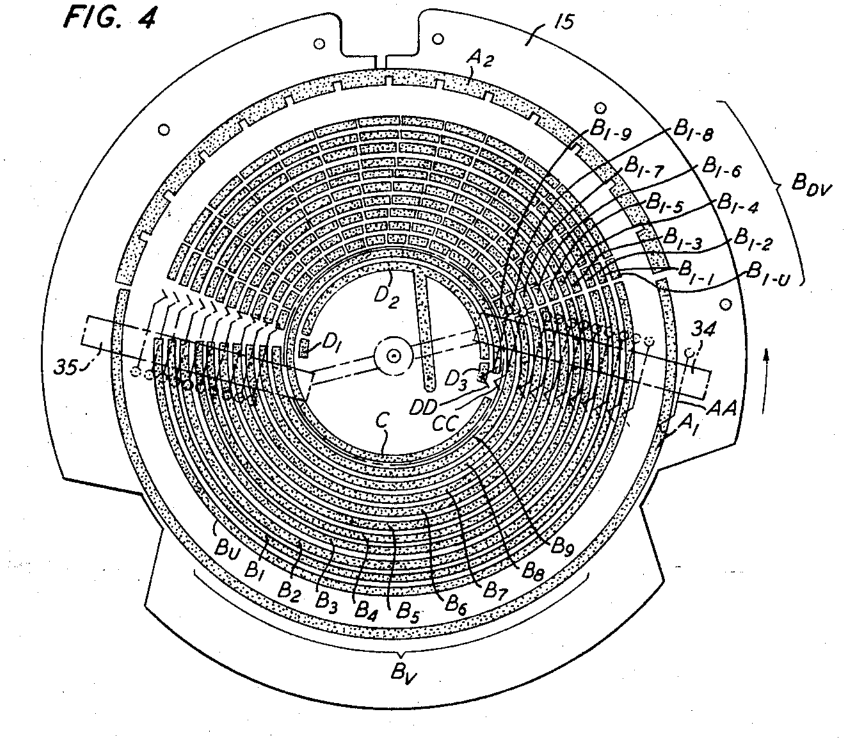
FIG. 4 is a bottom view of the printed circuit board.

Referring now to FIG. 4, each conductor $S_{DV}$ is connected through the printed circuit board 15 to another individual conductor on the underside of the printed circuit board. This second group of conductors is designated as $B_{DV}$, and the subscripts assigned to these conductors is the same as that assigned to the conductor $S_{DV}$ that they are connected to. Thus the conductor $B_{1-9}$ is electrically connected to the conductor $S_{1-9}$, the conductor $B_{2-U}$ is electrically connected to the conductor $S_{2-U}$, and so on. The conductors $B_{DV}$ comprise abbreviated arcs and those having the same value, that is, the same subscript V, extend along a common circular center line, the center lines being concentric.

The underside of the printed circuit board 15 also has a group of conductors designated $B_V$. The conductors $B_V$ are elongated arcs, and they extend along the same circular center lines as the conductors $B_{DV}$. As would be expected, the subscript V assigned to an individual conductor $B_V$ corresponds to the subscript V assigned to each of the conductors $B_{VD}$ extending along the same center line. Thus the outermost conductor $B_V$ is designated $B_U$ while the innermost conductor is designated $B_9$.

Referring again to FIG. 3, each of the conductors $B_V$ is connected through the printed circuit board 15 to radial conductors on the upper surface of the printed circuit board that connects each of the conductors $B_V$ to an individual conductor designated $F_V$. The conductors $F_V$ are short arcs and all extend along a common circular center line. The subscript V assigned to each conductor $F_V$ is the same as that of the conductor $B_V$ to which it is connected. Thus the conductor $F_U$ is electrically connected to the conductor $B_U$, the conductor $F_1$ is electrically connected to the conductor $B_1$, and so on.

The upper surface of the printed circuit board 15 also has an elongated semicircular conductor F that extends along the same circular center line as the conductors $F_V$ and has a circular conductor G that is adjacent to the conductors $F_V$ and F. The conductor G is connected through the printed circuit board 15 to a conductor $D_2$ on the underside thereof, and, as shown in FIG. 4, the conductor $D_2$ is intermediate conductors $D_1$ and $D_3$ that extend along the same circular center line as it.

The under surface of the printed circuit board 15 further has a circular conductor C that is adjacent to the conductors $D_1$, $D_2$, $D_3$ and has a pair of semicircular conductors $A_1$ and $A_2$ that lie along a common circular center line to the outside of and concentric with the conductors $B_{VD}$ and $B_V$. The conductor $A_2$ has equally spaced discontinuities therein that provide fourteen portions.

Figures 5, 6:
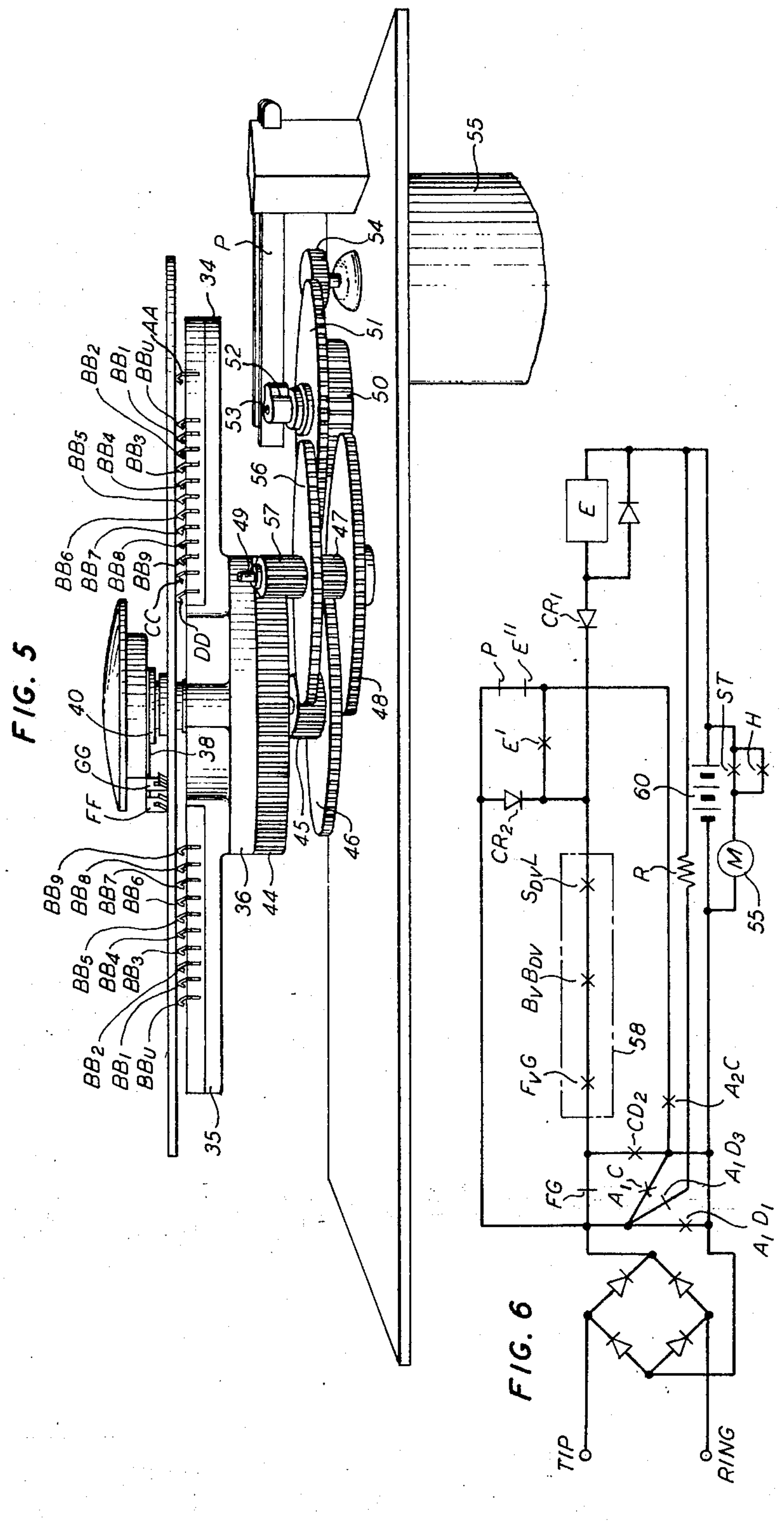
FIG. 5 is a side view of the call transmitter with the face plate and digit selectors removed.
FIG. 6 is a schematic circuit of a first embodiment of the call transmitter.

Referring now to FIGS. 4 and 5, the conductors on the underside of the printed circuit board 15 are engaged by two groups of contacts, the groups of contacts being respectively mounted on arms 34 and 35 that extend radially from a hub 36. The contacts on the arm 34 are designated AA, $BB_U$ through $BB_9$, CC, and DD. The contacts in the arm 35 are designated $BB_U$ through $BB_9$.

The contacts are supported in the arms 34 and 35 so as to be spaced from and electrically insulated from one another. In addition, the contacts are spaced along the arms 34 and 35 so that the contacts AA engage the center line of the conductors $A_1$ and $A_2$, the contacts $BB_U$ through $BB_9$ respectively engage the center lines of the conductors $B_{DV}$ and $B_V$, the contacts CC engage the center line of the conductor C, and the contacts DD engage the center line of the conductors $D_1$, $D_2$, and $D_3$. The contacts AA, CC, and DD in the arm 34 are electrically connected to one another by a strap (not shown), and each of the contacts BB on the arm 34 is electrically connected to the corresponding contact BB on the arm 35 by a conductor (not shown).

As tshown in FIGS. 3 and 5, in a similar manner, the conductors F and $F_V$ are engaged by a contact FF and the conductor G is engaged by a contact GG. The contacts FF and GG are mounted on an arm 38 extending from a hub 40 and electrically connected to one another.

The hubs 36 and 40 are both mounted on a common shaft, the hub 36 being secured to a gear 44 that is rotatively mounted on the shaft and the hub 40 being fixedly mounted on the shaft. A pair of gears 45 and 46 are also fixedly mounted on the same shaft.

The gear 46 meshes with a gear 47 fixedly mounted with a gear 48 on a shaft 49. The gear 48 in turn meshes with a gear 50 fixedly mounted with a gear 51 and a cam 52 on a shaft 53. Finally, the gear 51 meshes with a gear 54 fixedly mounted on the shaft of a motor 55. Advantageously, the motor 55 and gears 46, 47, 48, 50, 51, and 54 are selected to provide the cam 52 with a speed of 600 revolutions per minute and the hub 40, and thereby the contacts FF and $GG_1$, with a speed of 37.5 revolutions per minute. The cam 52 interacts with a pair of contacts to provide a normally closed pulsing switch P that opens and closes ten times a second.

The gear 45, which rotates at the same speed as the hub 40, meshes with a gear 56 rotatively mounted with a gear 57 on the shaft 49. The gear 57 meshes in turn with the gear 44. Advantageously the gears 44, 45, 56, and 57 are chosen to provide the hub 36, and thereby the contacts AA through DD, with a speed of approximately 1.1 revolutions per minute. This results in the contacts FF and GG rotating through 34 revolutions in the same time that the contacts AA through DD rotate through a single revolution. The contacts FF and GG rotate in a clockwise direction while the contacts AA through DD rotate in a counterclockwise direction.

Referring now to FIGS. 3, 5, and 6, the interaction of the contacts FF and GG with the conductors F and G respectively provides the equivalent of a switch designated FG. In addition, the interaction of the contacts with the conductors $F_V$ and G respectively provides the equivalent of ten switches designated $F_VG$. The switches FG and $F_VG$ are actuated in sequence, and the switch FG is normally closed. That is, it is closed when the call transmitter is in the home position, which is the position illustrated in FIG. 3. The switches $F_VG$ are all normally open.

The speed of rotation of the contacts FF and GG and the length of the conductors $F_V$ are such that the switches $F_VG$ close and open at the same frequency as the pulsing switch P. Furthermore, the switches $F_VG$ are synchronized with the pulsing switch P so that the pulsing switch opens and closes during the time that an individual switch $F_VG$ is closed.

Turning to FIGS. 4, 5, and 6, the interaction between the contacts AA with the conductors $A_1$ and $A_2$, the contacts CC with the conductor C, and the contacts DD with the conductors $D_1$, $D_2$, and $D_3$ provides the equivalent of five switches designated $A_1C_1$, $A_1D_1$, $A_1D_3$, $A_2C$, and $CD_2$, and these switches are actuated in a particular sequence. The switch $A_1D_3$ is normally closed, that is, it is closed when the call transmitter is in the home position, which is the position illustrated in FIG. 4. All the rest of the switches are normally open.

The interaction of the contacts $BB_U$ through $BB_9$ with the conductors $B_V$ and $B_{DV}$ provides the equivalent of ten groups of normally open switches designated $B_VB_{DV}$.

There are fourteen switches in each group, and the switches in each group are actuated in sequence. In addition, a single switch in each group of switches $B_VB_{DV}$ is actuated for each sequential actuation of the switches $F_VG$.

Figure 6A:
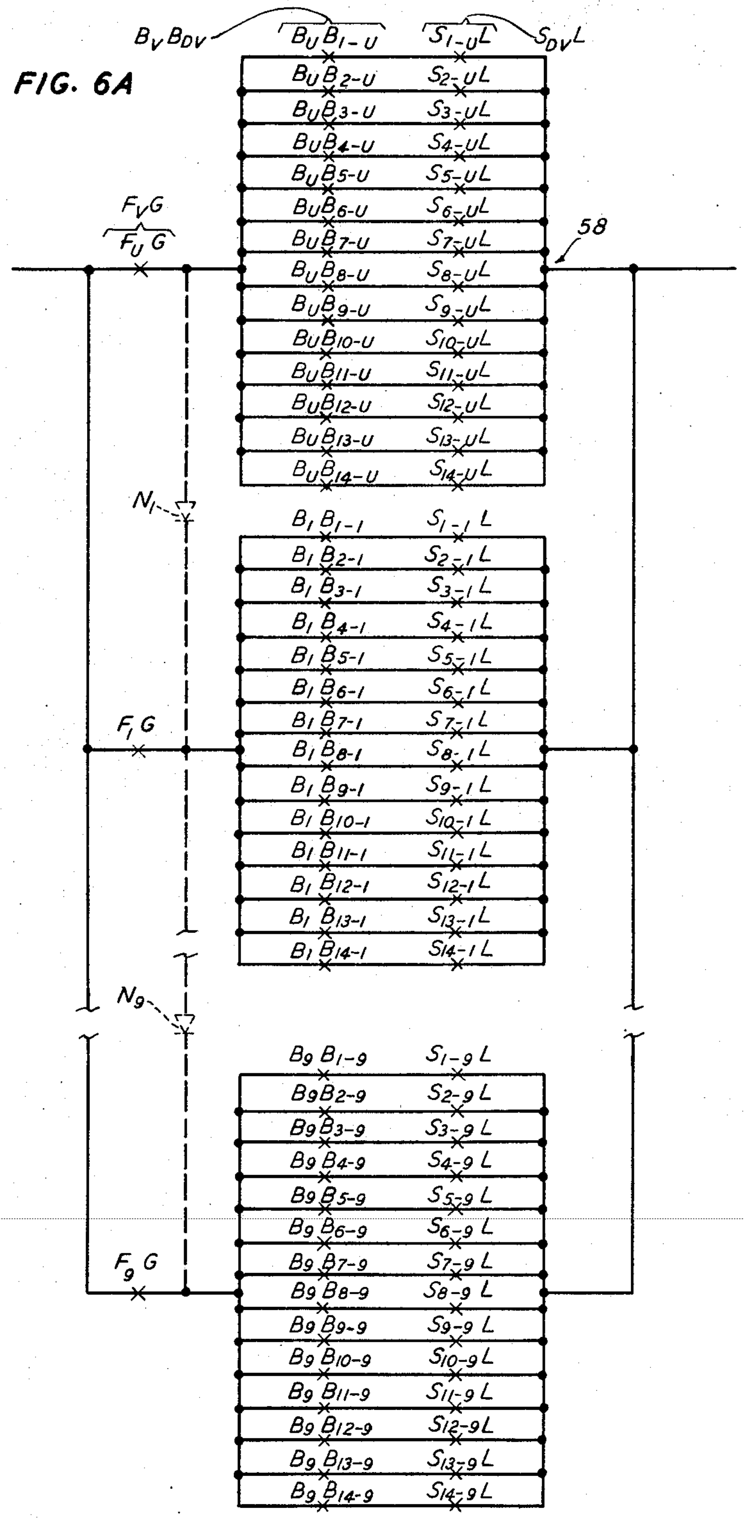
FIG. 6A is a more detailed schematic presentation of a portion of the switching matrix shown in FIG. 6.

Inasmuch as each conductor $B_{DV}$ is connected through the printed circuit board 15 to the corresponding conductor $S_{DV}$, each switch $B_VB_{DV}$ is connected in series with the corresponding switch $S_{DV}L$. Furthermore as indicated in FIG. 6A, each group of switches $B_VB_{DV}$ is thereby connected to a corresponding group of switches $S_{DV}L$, the series connected pairs of switches $B_VB_{DV}$ and $S_{DV}L$ in the combined group being connected in parallel with each other.

Finally, inasmuch as conductor $B_V$ is connected to the corresponding conductor $F_V$, each combined group of switches $B_VB_{DV}$ and $S_{DV}L$ is connected in series with the corresponding switch $F_VG$, and each switch $F_VG$ and the combined group in series therewith is connected in parallel with each other switch $F_VG$ and the combined group in series therewith. This interconnection between the switches $S_{DV}L$, $B_VB_{DV}$, and $F_VG$ provides a switching matrix 58.

In addition to the foregoing, the call transmitter includes a relay E that controls the operation of a normally open switch E′ and a normally closed switch E″. The relay E is directly connected to one side of a battery 60 and connectable to the other side of the battery through a diode $CR_1$, the switching matrix 58, and the normally open sequence switch $CD_2$. The relay E when energized by the battery 60 closes the normally open relay switch E′ and opens the normally closed relay switch E″, whereupon the relay is connectable to the battery through the relay switch E′ and the normally open sequence switch $A_2C$.

The motor 55 is connectable across the battery 60 by means of a normally open start switch ST or a normally open home switch H, the two switches being connected in series with the motor and in parallel with one another. The normally open start switch ST is manually closed, while the normally open home switch H is automatically closed when the motor 55 is energized and the call transmitter is displaced from the home position. The normally open home switch H thereupon remains closed until the call transmitter returns to the home position.

The battery 60 is itself connectable across the ring and tip conductors of the telephone line with which the call transmitter is associated by means of the normally closed sequence switch $A_1D_3$ and a resitsor R. The battery 60 when so connected is charged from the telephone line, the load resistor R being of a value to restrict current flow to a level whereat the central office is not caused to respond.

The circuit of the call transmitter includes six other paths between the ring and tip conductors of the telephone line. These paths comprise (1) the normally open sequence switch $A_1C$; (2) the normally open sequence switch $A_1D_1$; (3) the normally closed sequence switch FG and the normally open sequence switch $CD_2$; (4) the normally closed pulsing switch P, the normally closed relay switch E″, and the normally closed sequence switch $A_2C$; (5) a diode $CR_2$, the switching matrix 58, and the normally open sequence switch $CD_2$; and (6) the diode $CR_2$, the normally open relay switch E′, and the normally open sequence switch $A_2C$.

The diode $CR_1$ prevents current flow from the tip side of the telephone line through the diode $CR_2$ and the relay E to the battery 60, thereby avoiding pulsing errors due to current flow through the battery. The diode $CR_2$ prevents energization of the relay E when the normally open sequence switch $A_2C$ is closed, that is, it prevents current flow from the battery 60 through the relay E, the diode $CR_1$, the normally closed pulsing switch P, the normally closed relay switch E″, and the sequence switch $A_2C$ to the other side of the battery.

The first step in the operation of the call transmitter is the selection of the telephone number to be called. Referring to FIGS. 1 and 2, this is done by positioning the selector 14 for each digit so that the boss 30 thereof is aligned with the indicium corresponding to the value of the digit. The contacts 32 of each selector 14 thereby close the normally open selective switch $S_{DV}L$ corresponding to the selected value.

The call transmitter as illustrated is programed to dial the telephone number 9 724 2165. The first digit 9 is to dial out of a private branch exchange, and because a second dial tone comes on the line following the dialing of this digit, the selectors 14 for the second and third digits are placed in the U position to provide a several second pause before the remaining digits of the telephone number are transmitted. The selectors 14 for the fourth through tenth digits are positioned according to the remaining digits of the telephone number. The selectors 14 for the eleventh through fourteenth digits are placed in the U position since they are unused.

Turning now to FIGS. 5 and 6, after the call transmitted has been programed to call the desired telephone number, the start switch ST is manually closed, connecting the motor 55 across the battery 60. The motor 55 is thereby energized, and the motor acting through the train of gears commences to rotate the cam 52 and the contacts AA through GG. The call transmitter is displaced from its home position, and the home switch H thereupon closes and provides an alternate connection for the motor 55 across the battery 60. Thus when the start switch ST is released, the motor 55 remains energized.

The battery itself is, at this time and at all times that the call transmitter is not in operation, connected across the telephone line by the normally closed sequential switch $A_1D_3$. Although the resistor R limits the current flow from the telephone line to a level below that necessary for the central office to recognize that a station is on the line, the current flow serves to maintain the battery 60 in a charged condition.

Referring also to FIGS. 3 and 4, less than a second after the motor 55 is energized, the contact CC engages the conductor C and the normally open sequential switch $A_1C$ closes. This provides a path between the tip and ring conductors that permits full line current to flow, and consequently the central office now recognizes that the call transmitter is on the telephone line. The central office responds by generating a dial tone.

About a second later the contact DD moves from the conductor $D_3$ to the conductor $D_2$ and as a result the normally closed sequential switch $A_1D_3$ opens, disconnecting the battery 60 from across the telephone line, and the normally open sequential switch $CD_2$ closes. This is followed by the movement of the contact AA from the conductor $A_1$ to the conductor $A_2$, whereby the closed normally open sequential switch $A_1C$ opens and the normally open sequential switch $A_2C$ closes.

At this point approximately five seconds have elapsed since the energization of the motor 55, and during that time the contacts FF and GG have made two complete revolutions and are again approximately in the home position. The normally closed sequential switch FG is therefore closed and in conjunction with the closed normally open sequential switch $CD_2$ serves to maintain the connection of the call transmitter across the telephone line upon the opening of the closed normally open sequential switch $A_1C$. As will be more apparent as the description continues, the normally closed sequential switch FG in combination with the normally open sequential switch $CD_2$ provide an interdigital path for the call transmitter, that is, they provide a path across the telephone line during the period between the transmission of digits.

Following the closing of the normally open sequential switch $A_2C$, the contacts FF move into the space between the conductor F and the conductor $F_U$ whereupon the normally closed sequential switch FG opens. Thus, the closed normally open sequential switch $A_2C$ in combination with the normally closed pulsing switch P and the normally closed relay switch E″ provide the sole path by which the call transmitter is connected across the telephone line. This path is hereinafter referred to as the dialing path.

Referring also to FIG. 6A, the contacts $BB_U$ then engage the conductors $B_{1-U}$ and $B_U$, closing the normally open sequential switch $B_UB_{1-U}$, and immediately thereafter the contact FF moves into engagement with the conductor $F_U$, closing the normally open sequential switch $F_UG$. Since the selector 14 for the first digit is positioned to dial the number 9, only the normally open selective switch $S_{1-9}L$ is closed, and therefore no path is provided through the switching matrix 58. The dialing path remains the sole path across the telephone line, and when the normally closed pulsing switch P opens, the path is interrupted and a first pulse is transmitted over the telephone line.

The pulsing switch P closes, and the contacts $BB_1$ engage the conductors $B_1$ and $B_{1-1}$, closing the normally open sequential switch $B_1B_{1-1}$. In addition, the contact FF moves from the conductor $F_U$ to the conductor $F_1$, closing the normally open sequential switch $F_1G$. Again the dialing path is the sole path across the telephone line, and upon the opening of the normally closed pulsing switch P, a second pulse is transmitted over the telephone line.

A third, fourth, fifth, sixth, seventh, eighth, and ninth pulses are transmitted as the contact FF moves over the conductors $F_2$ through $F_8$ and the pulsing switch P is opened and closed in synchronism therewith. Subsequent to the transmission of the ninth pulse, however, the contact FF moves from the conductor $F_8$ to the conductor $F_9$, closing the normally open sequential switch $F_9G$. The contacts $BB_9$ are at this time in engagement with the conductors $B_9$ and $B_{1-9}$, closing the normally open sequential switch $B_9B_{1-9}$, and since the normally open selective switch $S_{1-9}L$ is closed, a path is provided through the switching matrix 58. The switching matrix 58 in conjunction with the diode $CR_2$ and the closed normally open sequential switch $CD_2$ provides a blanking path in parallel with the dialing path and hence when the normally closed pulsing switch P opens, no pulse is transmitted.

In addition to the blanking path, a path is provided from the positive side of the battery 60 through the relay E, the diode $CR_1$, the switching matrix 58, and the closed normally open sequential switch $CD_2$ to the negative side of the battery. The relay E is thereby energized, closing the normally open relay switch E′ and opening the normally closed relay switch E″.

With the closing of the normally open relay switch E, a path, hereinafter referred to as the energizing path, is provided from the positive side of the battery through the relay E, the diode $CR_1$, the closed normally open relay switch E′, and the closed normally open sequential switch $A_2C$ to the negative side of the battery. Thus the relay E remains energized when the contacts FF move from the conductor $F_9$, opening the sequential switch $F_9G$ and thereby terminating the blanking path.

The closing of the normally open relay switch E′ also provides a path, hereinafter referred to as the shunt path, that extends from the tip conductor through the diode $CR_2$, the closed normally open relay switch E′, and the closed normally open sequential switch $A_2C$ to the ring conductor. Thus a path that is not interrupted by the opening of the pulsing switch P is maintained when the blanking path is terminated. The opening of the normally closed relay switch E″ prevents the repetitive operation of the pulsing switch P from switching line current on and off through the diode $CR_2$.

The contact FF then engages the conductor F closing the open normally closed sequential switch FG, and the interdigital path, comprising the normally closed sequential switch FG and the closed normally open sequential switch $CD_2$, is again established across the telephone line. This is followed by the engagement of the contact AA with the first discontinuity in the conductor $A_2$, whereby the normally open sequential switch $A_2C$ opens briefly. The energizing path for the relay E and the shunt path across the telephone line are thereby interrupted. The relay E is de-energized, and the relay switches return to their normal condition.

The selector 14 for the second digit is in the U position whereby the normally open selective switch $S_{2-U}L$ is closed. Consequently when the contact FF leaves the conductor F, terminating the interdigital path, and engages the conductor $F_U$, the contacts $BB_U$ at this time being in engagement with the conductors $B_U$ and $B_{2-U}$, a path is provided through the switching matrix 58. The path this time comprises the closed normally open selective switch $S_{2-U}L$, the closed normally open sequential switch $B_UB_{2-U}$, and the closed normally open sequential switch $F_UG$.

With the provision of a path through the switching matrix 58, the blanking path is established across the telephone line. In addition, the relay E is energized whereby both the shunt path and the energizing path are established, the shunt path maintaining the connection of the call transmitter across the telephone line when the path through the switching matrix is terminated. Both paths remain until the contact AA engages the second discontinuity in the conductor $A_2$, at which time the interdigital path is again established. Consequently no pulses are transmitted for the second digit.

The third through fourteenth digits are dialed in a similar manner to that described above. Then during the interdigital period following the fourteenth digit, the contact AA leaves the conductor $A_2$ and engages the conductor $A_1$ whereby the sequential switch $A_2C$ opens and the sequential switch $A_1C$ closes. The closed normally open sequential switch $A_1C$ provides a path across the telephone line and it remains closed until just before the call transmitter returns to the home position. During this time the prerecorded message of the automatic reporting telephone is transmitted.

When the closed normally open sequential switch $A_1C$ opens, the telephone line is dropped. The open normally closed sequential switch $A_1D_3$ then closes to reconnect the battery 60 across the telephone line, and upon the return of the call transmitter to the home position, the closed normally open home switch H opens to disconnect the motor 55 from the battery.

Figure 7:
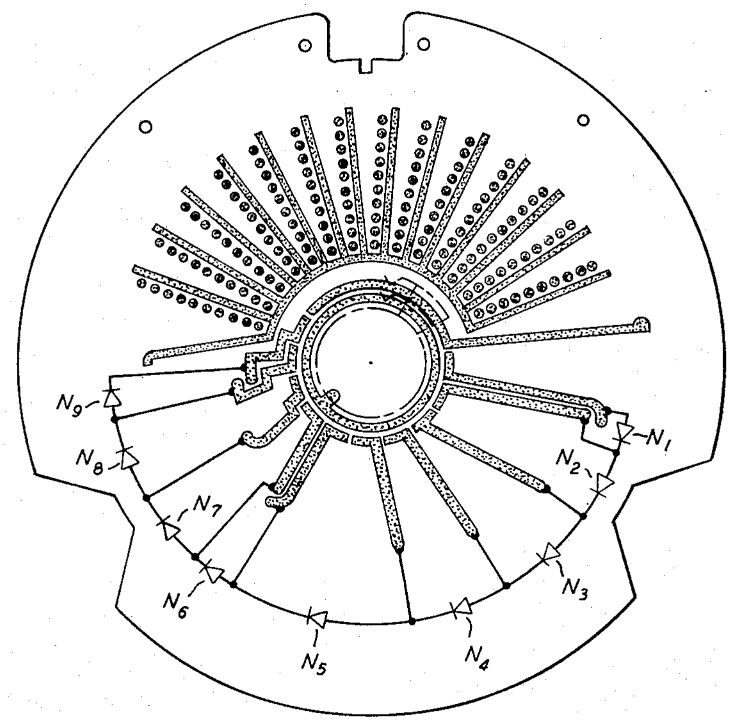
FIG. 7 is a top view of the printed circuit board modified according to a second embodiment of the call transmitter.
Figure 8:
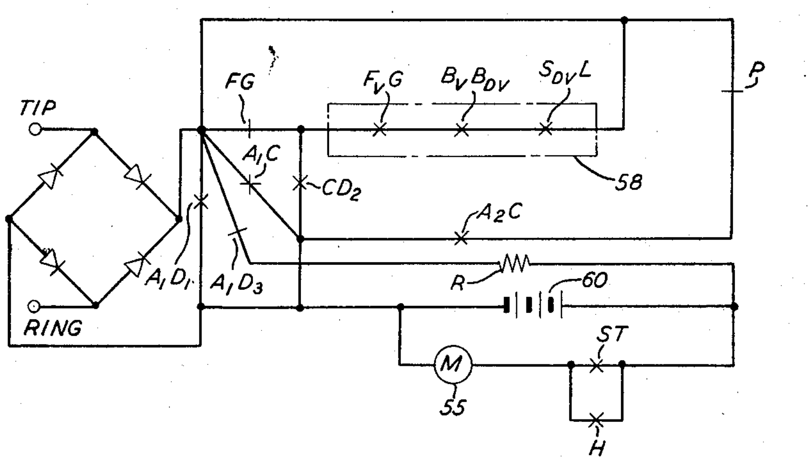
FIG. 8 is a schematic circuit of the second embodiment of the call transmitter.

An alternate embodiment of the foregoing is disclosed in FIGS. 7 and 8. In this embodiment the relay E, the switches E′ and E″ operated thereby, and the diodes $CR_1$ and $CR_2$ are replaced by nine diodes designated $N_1$ through $N_9$ in the switching matrix 58.

As illustrated in FIG. 7, an individual diode N is connected between each adjacent pair of conductors $F_V$, the diode $N_1$ being connected between the conductors $F_U$ and $F_1$, the diode $N_2$ being connected between the conductors $F_1$ and $F_2$, and so on. In addition, the diodes N are all poled in the same direction, which direction permits current flow from the conductor $F_U$ to the conductor $F_9$.

The only other change necessary is that the conductors $B_{DV}$ associated with a common digit, that is, each group of conductors $B_{DV}$ having the same subscript D, must terminate along a common radial line. This is necessary so that the switches $B_VB_{DV}$ associated with the same digit open at the same time.

With this arrangement, once a path has been provided through the switching matrix 58, it is maintained by means of the diodes N. This is seen by reference to FIG. 6A where the diodes are shown in dotted lines. Assume that the second digit is to be dialed. Since the selector 14 for the second digit is in the U position, the normally open selective switch $S_{2-U}L$ is closed. When the contacts $BB_U$ engage the conductors $B_U$ and $B_{2-U}$, closing the normally open sequential switch $B_UB_{2-U}$, the contact FF immediately thereafter engages the conductor $F_U$, closing the normally open sequential switch $F_UG$. A path is therefore provided through the switching matrix 58, the path comprising the closed normally open selective switch $S_{2-U}L$, the closed normally open sequential switch $B_UB_{2-U}$, and the closed normally open sequential switch $F_UG$.

The normally open selective switch $S_{2-U}L$ and the normally open sequential switch $B_UB_{2-U}$ remain closed, but when the contact FF moves from the conductor $F_U$ to the conductor $F_1$, the closed normally open sequential switch $F_UG$ opens and the normally open sequential switch $F_1G$ closes. However, a path through the switching matrix 58 still remains, the path at this time being through the closed normally open selective switch $S_{2-U}L$, the closed normally open sequential switch $B_UB_{2-U}$, the diode $N_1$, and the closed normally open sequential switch $F_1G$.

It is seen that a path through the switching matrix 58 will continue as the remaining switches $F_2G$ through $F_9G$ are closed and opened in sequence, the path incorporating the diodes N necessary to connect the closed normally open selective switch $S_{2-U}L$ and the closed normally open sequential switch $B_UB_{2-U}$ to the switch $F_VG$ that is closed.

Although two specific embodiments of the invention have been shown and described, it will be understood that they are but illustrative and that various modifications may be made therein without departing from the scope and spirit of this invention as defined in the appended claims.

What is claimed is:

1. A code transmitter comprising:

a plurality of first switches selectively actuated;

a plurality of second switches sequentially actuated, each second switch being serially connected to an individual first switch and the pairs of serially connected first and second switches being arranged in groups in which the pairs of serially connected first and second switches are in parallel with one another;

a plurality of third switches sequentially actuated, each third switch being connected in series with an individual group of first and second switches and each third switch and the group in series therewith being connected in parallel with each other third switch and the group in series therewith to provide a switching matrix, a path being provided through the switching matrix when a first, second, and third switch that are connected in series with one another are actuated simultaneously; and signal generating means controlled responsive to the provision of a path through the switching matrix.

2. A code transmitter as in claim 1 wherein the second switches within each group are actuated in sequence, and one second switch in each group is actuated for each complete sequential actuation of the third switches.

3. A code transmitter as in claim 1 wherein the first switches are selectively actuated prior to the sequential actuation of the first and second switches.

4. A code transmitter as in claim 1 wherein the signal generating means generates a signal concurrent with each sequential actuation of a third switch.

5. A code transmitter as in claim 4 further including means operative upon the provision of a path through the switching matrix for disabling the signal generating means for the balance of sequential actuation of the third switches then in progress.

6. A code transmitter as in claim 5 wherein the signal generating means comprises a pulsing switch connected across a telephone line, the switching matrix being connected in parallel with the pulsing switch.

7. A code transmitter as in claim 6 wherein the means operative upon the provision of a path through the switching matrix comprises a relay connected in series with the switching matrix across a power source, the relay having a normally open switch in parallel with both the pulsing switch and the switching matrix, whereby the relay is energized responsive to the provision of a path through the switching matrix and the normally open relay switch is closed, the relay remaining energized for the balance of the sequential actuation of the third switches then in progress.

8. A code transmitter as in claim 6 wherein the means operative upon the provision of a path through the switching matrix comprises a plurality of diodes, the diodes connecting each combined group of first and second switches to all the succeeding third switches, and all the diodes being poled in the same direction.

9. A code transmitter as in claim 1 wherein the second and third switches each comprise a plurality of rotating contacts that interact with a plurality of conductive areas on a printed circuit board.

10. A code transmitter as in claim 1 wherein one second switch in each group is actuated for each sequential actuation of the third switches.

References Cited

UNITED STATES PATENTS

| | | | |
|---|---|---|---|
| 3,078,349 | 2/1963 | Sasaki | 179—90 |
| 3,305,644 | 2/1967 | Watanabe | 179—90 |
| 3,366,747 | 1/1968 | Holzer | 179—90 |
| 3,418,431 | 12/1968 | Hershey. | |

KATHLEEN H. CLAFFY, Primary Examiner

T. J. D'AMICO, Assistant Examiner